United States Patent
Yoshinaka et al.

(10) Patent No.: US 8,464,769 B2
(45) Date of Patent: Jun. 18, 2013

(54) PNEUMATIC TIRE

(75) Inventors: Nobuyoshi Yoshinaka, Hyogo (JP); Masahiro Hanya, Hyogo (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 413 days.

(21) Appl. No.: 12/744,836

(22) PCT Filed: Aug. 22, 2008

(86) PCT No.: PCT/JP2008/065019
§ 371 (c)(1),
(2), (4) Date: May 26, 2010

(87) PCT Pub. No.: WO2009/072328
PCT Pub. Date: Jun. 11, 2009

(65) Prior Publication Data
US 2010/0319825 A1    Dec. 23, 2010

(30) Foreign Application Priority Data
Dec. 7, 2007    (JP) .................................. 2007-317347

(51) Int. Cl.
*B60C 9/22*    (2006.01)
*B60C 9/30*    (2006.01)
*B60C 11/00*    (2006.01)

(52) U.S. Cl.
USPC ......... 152/209.5; 152/531; 152/536; 152/456

(58) Field of Classification Search
USPC ............... 152/209.5, 455, 456, 531, 536, 526
IPC .............................. B60C 9/22,11/00, 9/30, 9/18
See application file for complete search history.

(56) References Cited

U.S. PATENT DOCUMENTS

| | | | | | |
|---|---|---|---|---|---|
| 5,400,847 | A | * | 3/1995 | Suzuki et al. | ................. 152/527 |
| 2005/0205189 | A1 | | 9/2005 | Yoshinaka | |

FOREIGN PATENT DOCUMENTS

| | | | |
|---|---|---|---|
| EP | 412777 A2 | * | 2/1991 |
| EP | 600398 A1 | * | 6/1994 |
| JP | 11-321237 A | | 11/1999 |
| JP | 11321237 A | * | 11/1999 |
| JP | 2001010308 A | * | 1/2001 |
| JP | 2001-233017 A | | 8/2001 |
| JP | 2005-263137 A | | 9/2005 |
| JP | 2007-168709 A | | 7/2007 |

OTHER PUBLICATIONS

English language machine translation of EP 600398, 1994.*

* cited by examiner

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A proper balance between ride comfort, steering stability, and road noise is achieved. A pneumatic tire (1) has a band layer (9) comprising a band ply (9A) where band cords are arranged at an angle of not more than 5 deg. with respect to the circumferential direction of the tire on the radially outer side of a belt layer (7). The band ply (9A) comprises a first ply piece (9a) covering only one side of end portions of the belt layer (7) and a second ply piece (9b) disposed adjacently to the first ply piece (9a), covering continuously the central portion of the belt layer (7) and another side of the end portions, and having a width larger than that of the above-mentioned first ply piece (9a). And, the band cords of said first ply piece (9a) and band cords of said second ply piece (9b) are different in modulus.

4 Claims, 8 Drawing Sheets

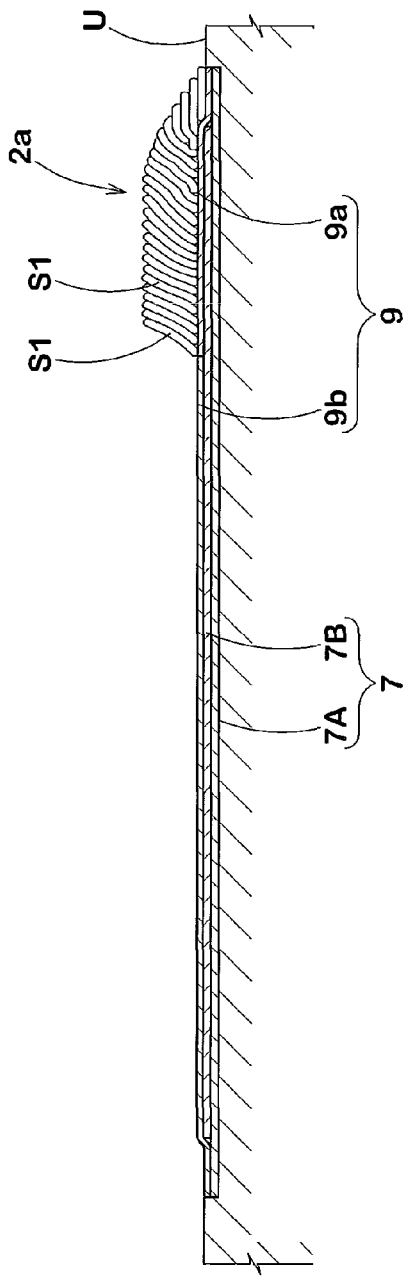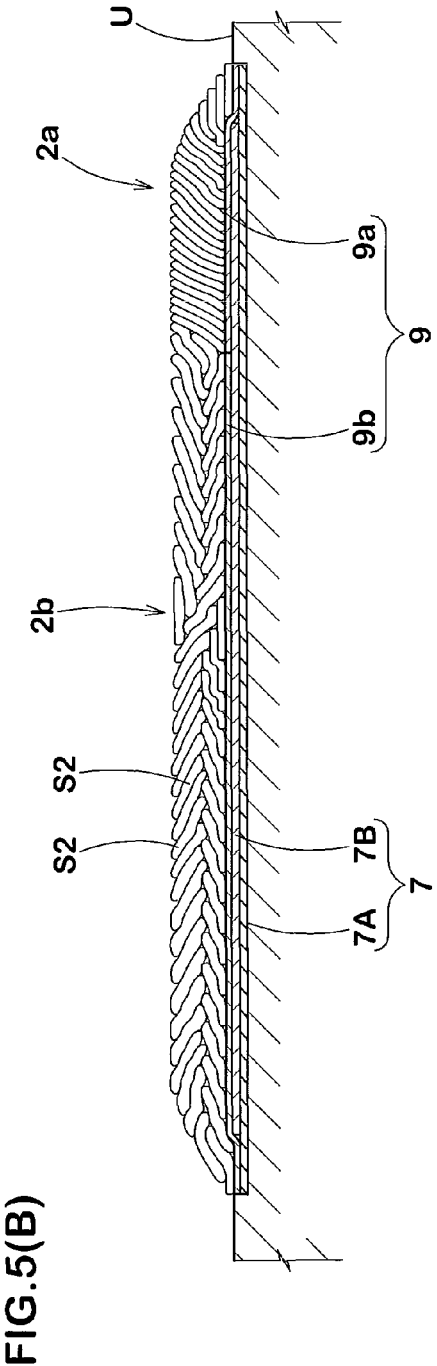

PNEUMATIC TIRE

TECHNICAL FIELD

The present invention relates to a pneumatic tire compatibly achieved in ride comfort, steering stability, and road noise in a high level.

BACKGROUND OF THE INVENTION

In recent years, in a radial tire, a technique is proposed to suppress movement of belt layers (for example, lifting and the like) while high speed running, and thus improving steering stability and noise performance, by providing between a belt layer and a tread rubber with a band layer made by arranging organic fiber cords substantially parallel to the circumferential direction of the tire. For example, the following patent document 1 discloses a tire made of a band layer comprising a pair of side portions positioned near edges of the belt layer and a center portion positioned therebetween. A modulus of the band cords disposed in both side potions is larger than a modulus of band cords disposed in the center portion. That is to say, this band layer is composed by disposing the band cords having different moduli symmetrically with respect to the tire equator.

However, asymmetric powers act on a tread portion of the tire. For example, a large load acts on a tread end portion on an outer side of a vehicle in a cornering. Therefore, to improve the steering stability, it is effective to arrange high modulus band cords in this portion. Meanwhile, as shown in an example of many domestically produced cars, when a negative camber is determined as Wheel Alignment, a large load acts on a tread end side on an inner side of the vehicle in a straight running.

Patent document 1: Japanese Unexamined Patent Application Publication No. 2005-263137.

DISCLOSURE OF THE INVENTION

Problems To Be Solved By The Invention

The present invention is devised in view of those facts, and it is an object of the present invention to provide a pneumatic tire, especially a pneumatic tire for a passenger vehicle, compatibly achieved in the ride comfort, steering stability, and road noise and the like on a higher level based on comprising band plies of a first ply piece covering only one side of end portions of a belt layer and a second ply piece disposed adjacent to the first ply piece and covering continuously the central portion of the belt layer and another side of the end portions; and band cords of the first ply piece and the second ply piece are different in modulus.

Means For Solving The Problem

The present invention is characterized in that a pneumatic tire comprising
  a troidal carcass extending from a tread portion to a bead core in each bead portion through each sidewall portion,
  a belt layer made of at least two belt plies arranged in the radially outer side of the carcass and inside the tread portion and having belt cords arranged at an angle of 15 to 40 deg. with respect to the tire equator, and
  a band layer made of band plies arranged in the radially outer side of the above-mentioned belt layer and having band cords arranged at an angle of not more than 5 deg. with respect to the circumferential direction of the tire, characterized in that
the above-mentioned band ply comprises
  a first ply piece covering only one side of end portions of the above-mentioned belt layer and
  a second ply piece disposed adjacently to the first ply piece, covering continuously the central portion of the above-mentioned belt layer and another side of the end portions, and having a width larger than that of the above-mentioned first ply piece; and band cords of the above-mentioned first ply piece and band cords of the above-mentioned second ply piece are different in modulus.

The modulus of the band cords is synonymous with "initial tensile resistance" described in Article 8.8 of "Test methods for chemical fibre tire cords", JIS (Japanese Industrial standards) L1017. The test condition of the initial tensile resistance is as follows, and adopting an average of results of ten tests:
  Test machine: Material Testing Machine 2005-type, INTESCO co., Ltd. product
  Test temperature: 20 deg. C.
  Test humidity: 65%
  A length of test material piece between grip portions: 250 mm
  Test speed: 300 mm/min In this description, the measurements of each part of a tire are determined by a tire mounted on a standard rim (not shown), defined under a standard state unloaded, and inflated to standard pressure unless otherwise noted. The "standard rim" is a design rim which may be a rim officially approved for the tire by a standard organization, namely, "standard rim" in JATMA, "Design Rim" in TRA, "Measuring Rim" in ETRTO and the like. The standard pressure is a pressure officially approved for the tire, for example, the "maximum air pressure" in JATMA, the "Inflation Pressure" in ETRTO, the maximum pressure given in the "Tire Load Limits at various cold Inflation Pressures" table in TRA or the like. In case of passenger car tires, however, 180 kPa is used as the standard pressure.

Effect of the Invention

The band ply of the pneumatic tire according to the present invention is provided with a first ply piece covering one of end portions of a belt layer, and a second ply piece disposed adjacently to the first ply piece and covering continuously the central portion of the belt layer and another side of the end portions; and band cords of the above-mentioned first ply piece and band cords of the above-mentioned second ply piece are different in modulus. A ply piece using high modulus band cords can be disposed on an outer side of a vehicle, and a ply piece using low modulus band cords can be disposed on an inner side of the vehicle, for example. Specifically, when the high modulus band cords are used for the first ply piece and are disposed on the outer side of the vehicle, ride comfort, steering stability, and road noise and the like are achieved in a high level.

BRIEF DESCRIPTION OF THE DRAWINGS

FIG. 5 is a cross sectional view explaining a method for manufacturing a tread rubber.

| EXPLANATION OF THE REFERENCE | |
| --- | --- |
| 1 | Pneumatic tire |
| 2 | Tread portion |
| 2G | Tread rubber |
| 2a | First rubber portion |
| 2b | Second rubber portion |
| 3 | Sidewall portion |
| 4 | Bead portion |
| 5 | Bead core |
| 6 | Carcass |
| 7 | Belt layer |
| 9 | Band layer |
| 9A | Band ply |
| 9a | First ply piece |
| 9b | Second ply piece |
| 9Y1 | Band cords of the first ply piece |
| 9Y2 | Band cords of the second ply piece |

BEST MODE FOR CARRYING OUT THE INVENTION

Hereinafter, an embodiment of the present invention will now be described on the basis of drawings.

Figure 1:
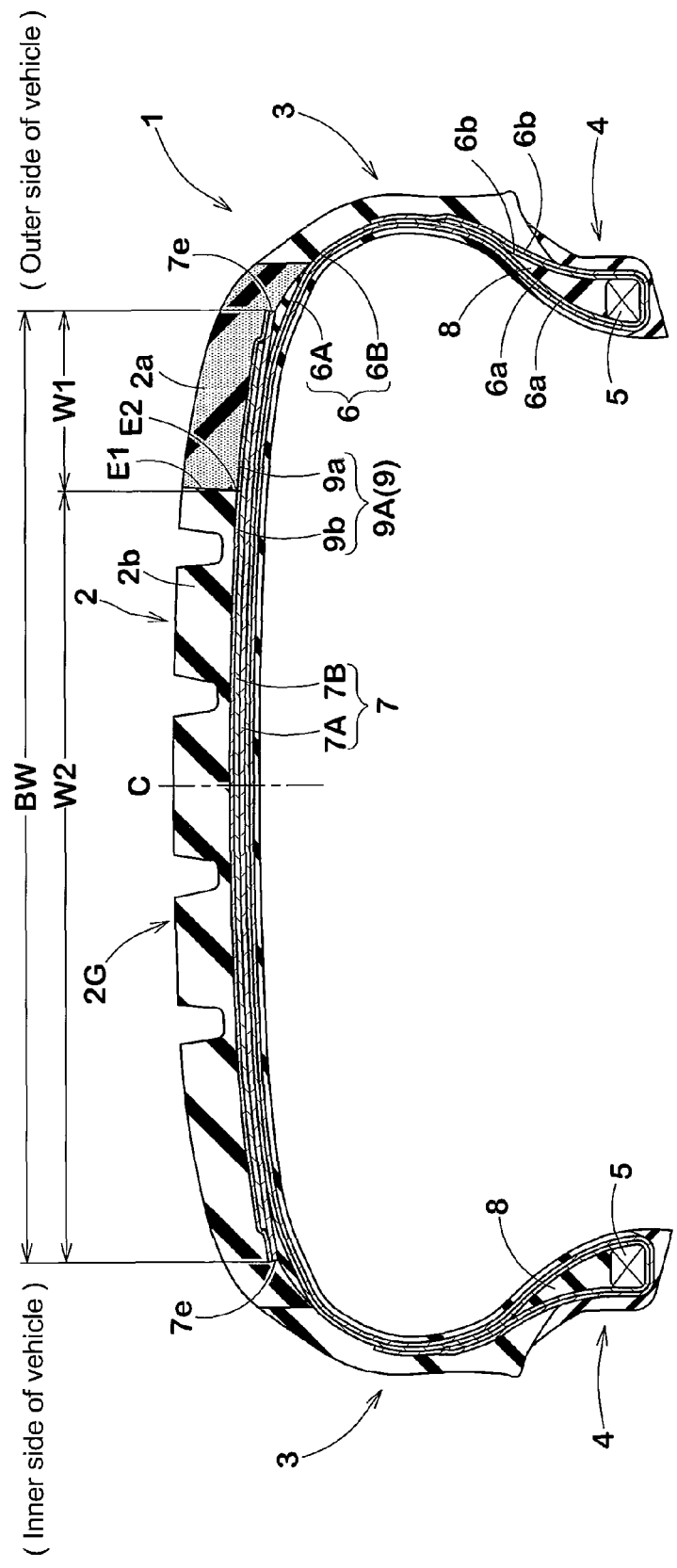
FIG. 1 is a cross sectional view of a pneumatic tire showing an embodiment of the present invention.
Figure 2:
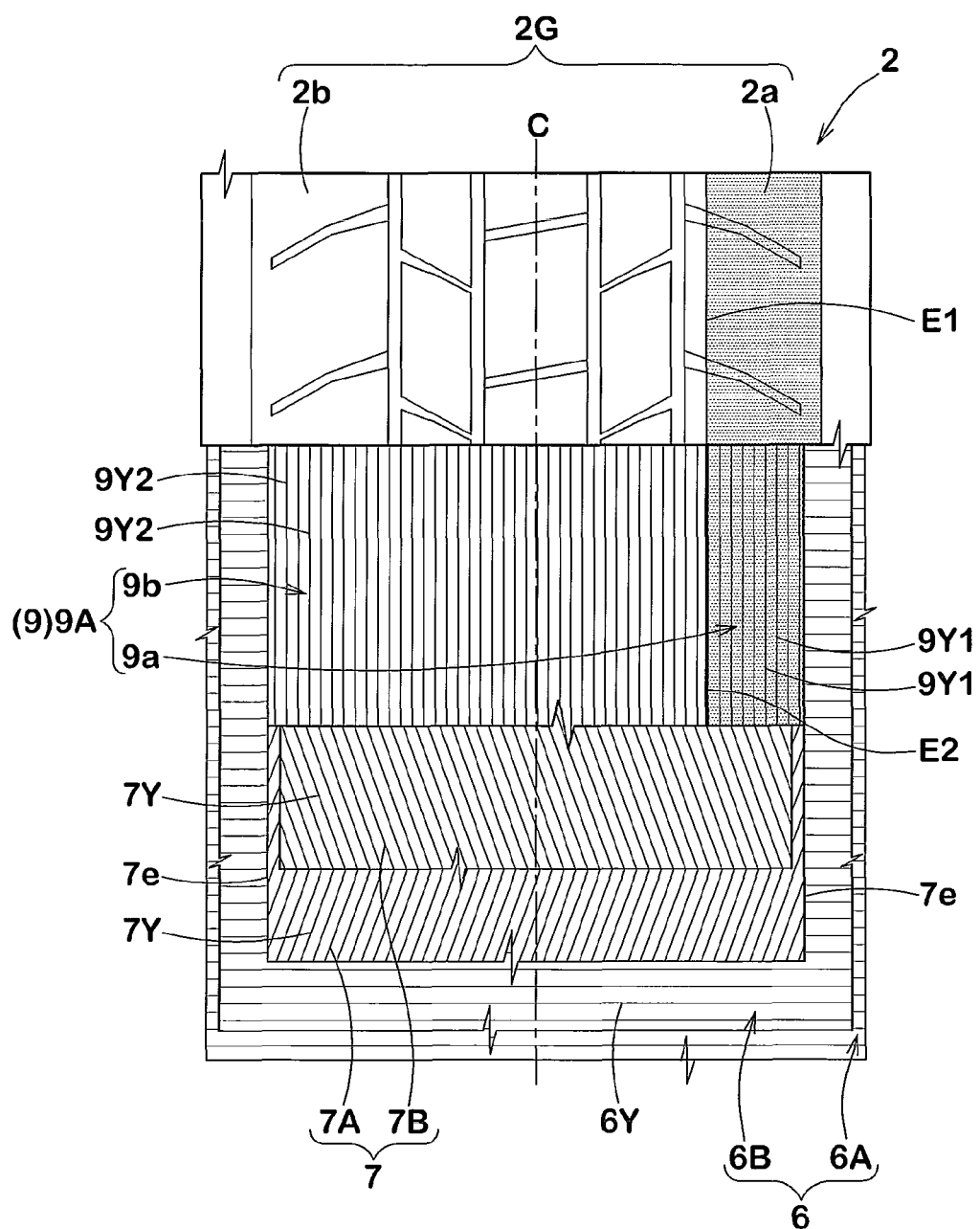
FIG. 2 is a development view of the tread portion thereof.

FIG. 1 shows a cross sectional view of the tire meridian section of a pneumatic tire of the present embodiment. FIG. 2 is a development view of the tread portion (a partial cross sectional view).

The pneumatic tire 1 of the present embodiment is a tubeless tire for a passenger car, and has a toroidal carcass 6 extending from tread portion 2 through a sidewall portion 3 to a bead core 5 in each bead portion 4, a belt layer 7 arranged in the radially outer side of the carcass 6 and inside the tread portion 2, a band layer 9 arranged in the radially outer side of the belt layer 7, and a tread rubber 2G arranged in the radially outer side of the band layer 9.

The pneumatic tire 1 of the present embodiment, an arrangement direction to a vehicle is designated. Specifically, in FIG. 1, the right side is on an outer side of the vehicle and the left side is on an inner side of the vehicle, respectively. Such an arrangement direction is indicated by letters of "INSIDE" or "OUTSIDE" on an outer surface of the sidewall portion 3 or the bead portion 4, for example.

The above-mentioned carcass 6 comprises of at least one carcass ply, two carcass plies in this example, 6A and 6B. The carcass plies 6A and 6b are made of cord plies covered with thin topping rubber on carcass cords. As shown in FIG. 2, the carcass cords 6Y are arranged at an angle of 60 to 90 deg., for example, with respect to the tire equator C. Preferable examples of materials of the above-mentioned carcass cords 6Y are organic fibers such as polyester, nylon, rayon, and aramid; however, steel cord may be also used depending on tire category and the like.

Each of the above-mentioned carcass plies 6A and 6B has a toroidal main portion 6a extending from the tread portion 2 through the sidewall portion 3 to the bead core 5 in the bead portion 4, and a turnup portion 6b continuing to the above-mentioned main portion 6a, extending radially outwardly, and turned up around the bead core 5 from axially inward to axially outward. Between the main portion 6a and the turnup portion 6b, there is a bead apex rubber 8 made of hard rubber and extending radially outwardly from the bead core 5 in a tapered manner.

The above-mentioned belt layer 7 is made of at least two belt plies wherein the belt cords 7Y are arranged at a small angle of 15 to 40 deg., for example, with respect to the tire equator C. The belt layer 7 of the present embodiment is made of two radially inner and outer belt plies 7A and 7B. The cords are overlapped in different orientations so as to intersect the belt cords 7Y each other in each ply. For the belt cords 7Y, steel cord is adopted; however, highly elastic organic fibers such as aramid, rayon, and the like may be also used as needed basis. Meanwhile, the radially inner belt ply 7A is larger in width than the outer belt ply 7B in the present embodiment; therefore, the end of the inner belt ply 7A determines an axial outer end 7e of the belt layer 7 in the present embodiment.

As shown in FIGS. 1 and 2, the band layer 9 of the present embodiment comprises of a single band ply 9A. The band ply 9A has the center of width disposed on the tire equator C and has substantially the same width BW of the belt layer 7. Then, almost all parts of the belt layer 7 are covered with the band layer 9. A width of the band layer 9 may be larger than a width BW of the belt layer 7.

The above-mentioned band ply 9A comprises a first ply piece 9a covering only one side of end portions 7e of the central portion of the belt layer 7 and a second ply pieces 9b being the rest of the above-mentioned belt layer 7 and disposed adjacently to the first ply piece 9a, that is, covering continuously from the central portion to another side of the above-mentioned end portions 7e, and having a width larger than that of the first ply piece 9a; and band cords of the first ply piece 9a and band cords of the second ply piece 9b are different in modulus. Meanwhile, both of the plies 9a and 9b are substantially adjacent each other in the width direction with no space therebetween.

In the above-mentioned each of the above-mentioned first ply piece 9a and second ply piece 9b, respective band cords 9Y1 and 9Y2 are arranged at an angle of not more than 5 deg. with respect to the tire equator C. As an preferred embodiment, each of the ply pieces 9a and 9b is preferably made by being disposed on an outer side of the belt layer 7 in the radial direction of the tire and by the winding band cords 9Y1 and 9Y2 spirally in the circumferential direction of the tire. Since there are not seams in such a band ply piece, it is desirable to improve uniformity of the tire and to reduce vibration in running and the like. In this regard, each of the band cords may be wound single, but it is preferable to be wound on the outer side of the belt layer 7 as a tape-like belt ply made of plural band cords arranged in parallel and embedded in topping rubber.

In the present embodiment, the first ply piece 9a is disposed on the outer side of the vehicle with respect to the tire equator, and the modulus of the band cords 9Y1 is set to be larger than the modulus of the band cords 9Y2 of the second band ply 9b. Therefore, in the band layer 9 of the present embodiment, the band cords being different in modulus are disposed bilaterally asymmetrically with respect to the tire equator C.

As mentioned above, large load is act on the side of the outer end portion of the belt layer 7 when cornering. In this portion, owing to disposing the first ply piece 9a having high modulus band cords 9Y1, it is possible to inhibit moving of the belt layer 7 effectively, thereby inhibiting a large deformation and improving the steering stability and high speed durability. Moreover, the road noise can be reduced.

On the other hand, the central portion of the tread portion 2 contacts to mostly ground at a great pressure while straight running. Therefore, to cover the central portion of the belt 7 with the second ply piece 9b comprising the deformable low modulus band cords 9Y2 makes restriction thereof weaken and the center portion comparatively flexibly deformable. It helps in shock absorption performance in the above-mentioned central portion and in improvement of the ride comfort. Moreover, as shown in an example of many domestically-produced cars, when the negative camber is determined as Wheel Alignment, the large load acts on the tread end side of the tread portion 2 on the inner side of the vehicle in a straight running. Therefore, the ride comfort and road noise in straight running can be reduced effectively by covering this portion with the second ply piece 9b of the low modulus band cords 9Y2.

Here, as not especially limited, when the above-mentioned axial width W1 of the above-mentioned first ply piece 9a is too small, the above-mentioned steering stability, the high speed running durability, and the road noise can be insufficiently expected to increase. When the axial width W1 of the first ply piece 9a is extremely large, the width w2 of the second ply piece 9a becomes small, thereby being liable to deteriorate the ride comfort and the road noise performance. From the viewpoint of this, the width W1 of the first ply piece 9a is preferably not less than 10%, more preferably not less than 20% of an axial width BW of the belt layer 7; and the upper limit thereof is preferably not more than 40%, more preferably not more than 30%. Moreover, it is desirable that a width W2 of the second ply piece 9b is preferably determined by a remaining width W2 obtained by subtracting the width W1 of the first ply piece 9a from the width BW of the belt layer 7.

when the modulus m1 of the band cord 9Y1 of the first ply piece 9a is, as not especially limited, extremely small, the moving of the end portions of the belt layer 7 on the outer side of the vehicle cannot be sufficiently suppressed, thereby deteriorating the improvement in steering stability and the suppressing effect in road noise. From this standpoint, the above-mentioned modulus m1 is preferably not less than 30 (cN/dtex), more preferably not less than 40 (cN/dtex). When the modulus m1 of the band cords 9Y1 of the first play piece 9a is extremely large, the ride comfort in normal running may extremely deteriorate; therefore, the modulus is preferably not more than 100 (cN/dtex), more preferably not more than 90 (cN/dtex).

Also, when the modulus m2 of the band cords 9Y2 of the second ply piece 9b, as not especially limited, is too large, it is difficult to improve the ride comfort; therefore, the modulus is preferably not more than 50 (cN/dtex), more preferably not more than 30 (cN/dtex). When the modulus m2 of the band cords 9Y2 of the second ply piece 9b is extremely small, it may cause extreme deterioration of the steering stability; therefore, the modulus is preferably not less than 10 (cN/dtex), more preferably not less than 15 (cN/dtex).

Moreover, a ratio (m1/m2) between the modulus m1 of the band cords 9Y1 of the first ply piece 9a and the modulus m2 of the band cords 9Y2 of the second ply piece 9b is preferably larger than 1.0; in order to be achieved in the steering stability and the ride comfort in a higher level, it is preferably not less than 1.5, more preferably not less than 2.0, further more preferably not less than 2.5. When the above-mentioned modulus ratio (m1/m2) is extremely large, there may be a large rigidity gap in a junction E2 between the first ply piece 9a and the second ply piece 9b, thereby deteriorating the tire durability because of concentration of strain at that part. Based on this standpoint, the upper limit of the above-mentioned modulus ratio (m1/m2) is preferably not more than 7.0, more preferably not more than 6.0, much more preferably not more than 5.0.

For the above-mentioned band cords 9Y1 and 9Y2, organic fiber cords, e.g. nylon, polyester, vinylon, polyethylene naphtalate (PEN), or aramid, for example, may be preferably used in combination arbitrarily. More preferably, for the band cords 9Y1 of the first ply piece 9a, polyethylene naphtalate (PEN), aramid, or the like may be used. For the band cords 9Y2 of the second ply piece 9b, nylon, polyester, vinylon, or the like, may be more preferably used. However, needless to say, these combinations are not limited, and composite cord made in combination of the above-mentioned fibers and the like may be also usable. Meanwhile, the above-mentioned modulus may be adjusted in accordance with changes of not only fiber materials but also twist numbers of filaments.

The present band ply 9A of the present embodiment has a substantially constant ends (the number of cords per 5 cm ply width) in the band cords 9Y1 and 9Y2. That is to say, the first ply piece 9a and the second ply piece 9b have the same ends of band cords. The ends is not limited, but it is preferably not less than 30, more preferably not less than 40; and, the upper limit thereof is preferably not more than 80, more preferably not more than 60.

In the present embodiment, the above-mentioned tread rubber 2G comprises the first rubber portion 2a arranged in the outer side of the first ply piece 9a in the radial direction of the tire, and the second rubber portion 2b arranged in the radially outer side of the second rubber portion 9b in the radial direction of the tire and having a hardness different from that of the first rubber portion 2a, wherein they are connected each other in the width direction. In the present embodiment, the first rubber portion 2a is made of harder rubber than that of the second rubber portion 2b.

Therefore, in the pneumatic tire 1 of the present invention, on the radially outer side of the first ply piece 9a comprising the high modulus band cords 9Y1 and being comparatively stretchy-unfavorable, there is the first rubber portion 2a made of hard rubber material to cope with this. Meanwhile, on the radially outer side of the second ply piece 9b comprising of the low modulus band cords 9Y2 and being comparatively stretchy, there is the second rubber portion 2b made of soft rubber material to cope with this. Hence, the rubber portions being different in hardness are disposed unsymmetrically with respect to the tire equator C in the tread rubber 2G of the present embodiment.

In such a pneumatic tire 1, the first ply piece 9a and the first rubber portion 2a, which are both difficultly deformable, work synergistically in reducing the movement of both end portions of the belt layer 7 more effectively, it may therefore improve the steering stability and the high speed durability. And, the second ply piece 9b and the second rubber portion 2b, which are both deformable, work synergistically in reducing effectively the binding force of the belt layer 7 in a region from the central portion to the end portion on the inner side of the tread portion 7 of the vehicle, in making the central portion of the region soft and deformable and in enhancing shock absorption performance. Therefore, the pneumatic tire 1 of the present invention can be compatibly achieve in ride comfort and steering stability in a high level. Moreover, the second rubber portion 2b made of soft rubber material can reduce the road noise.

Here, the hardness h1 of the first rubber portion 2a is not limited, but the binding force against the outer end portion of belt layer 7 on the vehicle cannot be sufficiently improved when it is too small. Hence, the hardness h1 is preferably not less than 55 deg., more preferably not less than 60 deg. While, when the hardness h1 of the first rubber portion 2a is too large, the ride comfort may extremely deteriorate; therefore, the hardness h1 is preferably not more than 80 deg., more preferably not more than 75 deg.

Also the hardness h2 of the second rubber portion 2b is not limited, but when it is too large, the shock absorption performance in the region from the central portion of the tread portion 2 to the inner side of the vehicle may deteriorate, and it may not achieve the ride comfort improvement and the road noise reduction. Therefore, the hardness h2 is preferably not more than 75 deg., more preferably not more than 70 deg. While, when the hardness h2 of the second rubber portion 2b is too small, the steering stability and wear resistance may extremely deteriorate. Based on this standpoint, the hardness (h2) of the second rubber portion 2b is preferably not less than 50 deg., more preferably not less than 55 deg.

The hardness of rubber means durometer A hardness measured with JIS type-A durometer which is found in accordance with the SIS K6253, under an environment of 23 deg. C.

Moreover, when a difference (h1−h2) between the hardness h1 of the first rubber portion 2a and the hardness h2 of the second rubber portion 2b is too small, the above-mentioned effects may not be sufficiently expected. Therefore, the hardness difference (h1−h2) is not less than 2 deg., more preferably not less than 3 deg., and much more preferably not less than 4 deg. Meanwhile, when the above-mentioned hardness difference (h1−h2) is too large, there may be a large rigidity gap in a junction E1 thereof; therefore, it may cause uneven wear and cracks starting from that portion. Based on this standpoint, the above-mentioned hardness difference (h1−h2) is preferably not more than 10 deg., more preferably not more than 9 deg., and much more preferably not more than 8 deg.

The inventors, in their experiments with various sorts of hardness of the tread rubber 2G, found that setting the dimensionless value, which was obtained by dividing the above-mentioned hardness difference (h1−h2) by a hardness unit (that is, 1 deg.), to be larger than the modulus ratio (m1/m2) of the above-mentioned band cords made the above-mentioned effects much more improved. More specifically, they found that the effects, which were caused from combinations of compounding of tread rubber having different hardness and the band structure of band cords having different moduli as mentioned above, were not sufficiently achieved when the dimensionless value of the above-mentioned hardness difference (h1−h2) was smaller than the above-mentioned modulus ratio (m1/m2).

Figure 3:
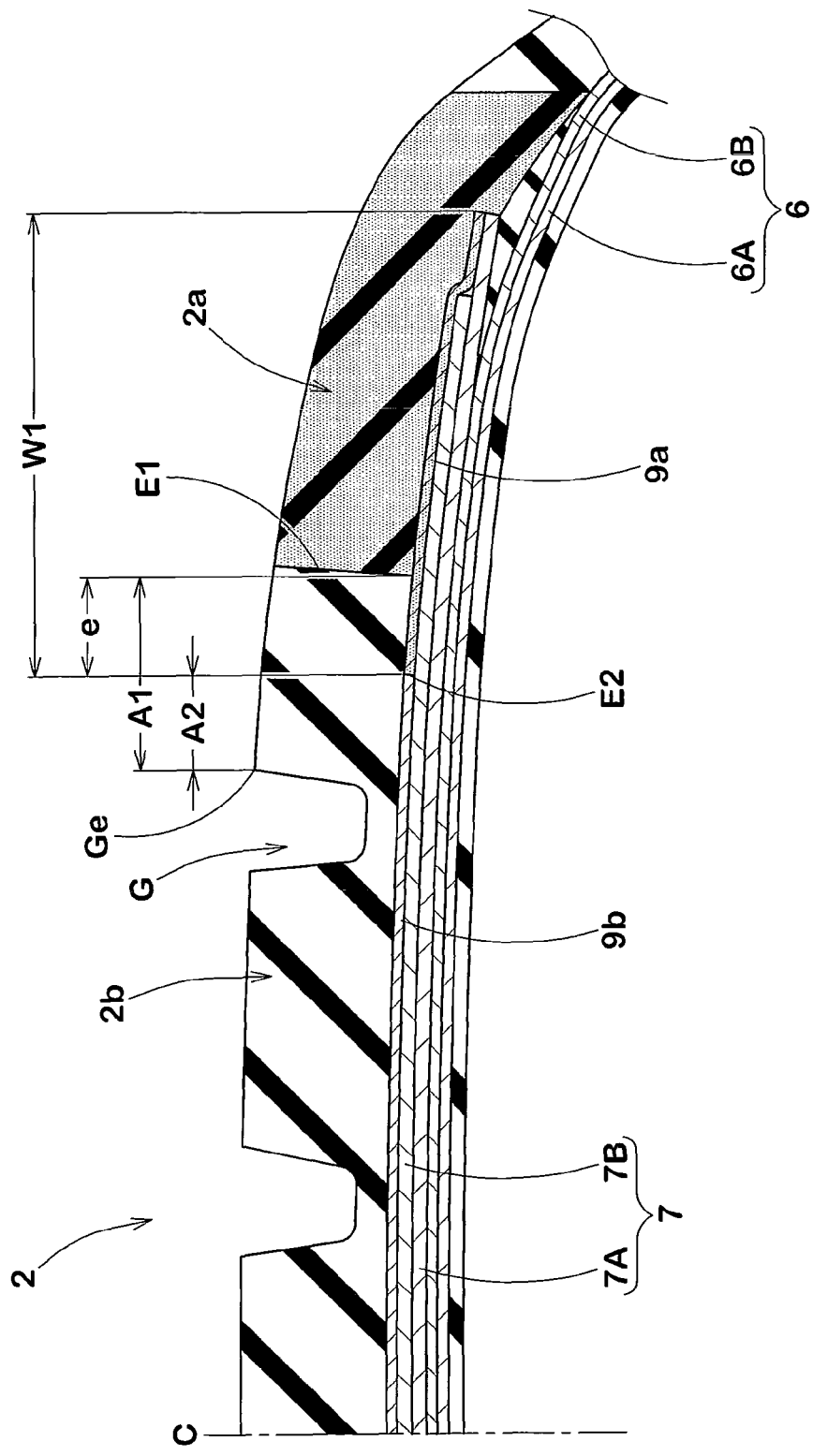
FIG. 3 is a partially enlarged view of the tread portion shown in FIG. 1.

In the present embodiment, the junction E1 between the first rubber portion 2a and the second rubber portion 2b is arranged in the tire axial direction at substantially the same portion of the junction E2 between the first ply piece 9a and the second ply piece 9b. However, as shown in FIG. 3, these junctions E1 and E2 achieve such effects even if they are displaced some in the axial direction of the tire. A displacement quantity (e) between the junction E1 and the junction E2 in the tire axial direction is preferably not more than 50%, more preferably not more than 30%, much more preferably not more than 10% of the axial width W1 of the first ply piece 9a. On this occasion, the bottom end of the above-mentioned junction E1 of the tread rubber 2G may be displaced by an axially inner side or outer side with respect to the junction E2 in the band ply 9A. In the present embodiment, the junction E1 is arranged at not more than 30 deg., more over not more than 20 deg., and not more than 10 deg with respect to the normal line of the tread surface.

The above mentioned tread portion 2 is provided with a longitudinal groove G extending in the circumferential direction of the tire. The longitudinal groove G becomes comparatively extremely-strained while the tire rolling under load, so that rubber cracks and the like starting from the junction E1 may occur when the above-mentioned junction E1 of the tread rubber 2G is at the position of the longitudinal groove. In the same manner, the bending deformation of the band layer 9 becomes comparatively large at a radially inner region of a groove bottom of the longitudinal groove G, so that the durability may deteriorate because of concentration of strain at that part when the junction E2 on the band ply side is at this position. Based on this perspective, the junctions E1 and E2 are preferably arranged in the longitudinal groove G or at positions outside the radially inner area. More preferably, each of the above-mentioned junctions E1 and E2 is preferably axially spaced apart from the groove edge Ge of each longitudinal groove G by a distance A1 or A2 of at least not less than 5 mm, more preferably not less than 10 mm. Specifically, it is preferable to dispose the junctions E1 and E2 more axially outwardly than the outmost longitudinal groove G in the axial direction of the tire.

Figure 4:
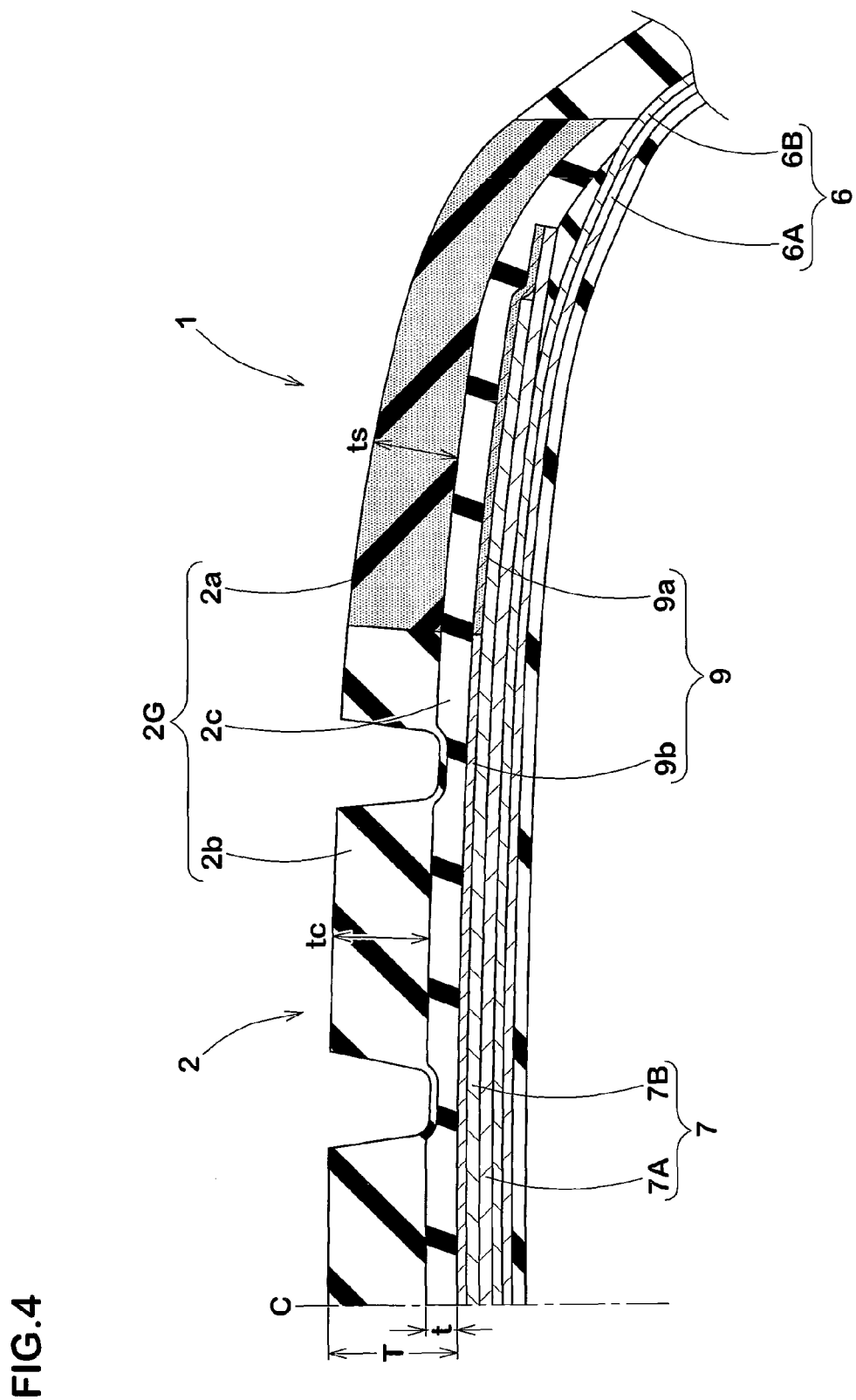
FIG. 4 is a partially enlarged view of the tread portion showing another embodiment of the present invention.

As shown in FIG. 4, the tread rubber 2G may be comprised of a number of differently compounded layers in the tire radial direction. In the present embodiment, the tread rubber 2G comprises a base rubber portion 2c arranged in the radially outer side of the tire to cover the whole width of the band layer 9, the above-mentioned first rubber portion 2a arranged in the radially outer side and in the outer side of the first ply piece 9a, and the above-mentioned second rubber portion 2b arranged in the outer side of the above-mentioned second ply piece 9b and situated close to the first rubber portion 2a.

The thickness (t) of the above-mentioned base rubber portion 2c extending outside the belt layer 7 is less than 50% of the whole thickness T of the tread rubber 2G. That is to say, a thickness (ts) of the above-mentioned first rubber portion 2a and a thickness (ts) of the second rubber portion 2b (each of them are measured in a portion except a groove) will be substantially not less than 50% of the whole thickness T of the tread rubber 2G, so as to achieve the effects of the present invention.

The tread rubber 2G having the above-mentioned first rubber portion 2a and the second rubber portion 2b can be formed of an integrally extruded item made by a rubber extruder. However, as shown in FIGS. 5(A) and (B), it is desirable that the tread rubber 2G is formed by spirally winding the unvulcanized ribbon-like rubber strips S1 and S2 in the tire circumferential direction. In this embodiment, the belt layer 7 and the band layer 9 are previously wound outside a cylindrical building drum U, thereby winding the first rubber strip s1 made of the hard rubber on one of the end portions, so that the first rubber portion 2a is formed. And, the second rubber strip 2S made of the soft rubber so as to situate close to this first rubber portion 2a is wounded, thereby forming the second rubber portion 2b. Such a strip laminations body is specifically preferable, so that it can change the thickness, cross sectional shape, and the like at will and can improved the productivity.

Figure 6:
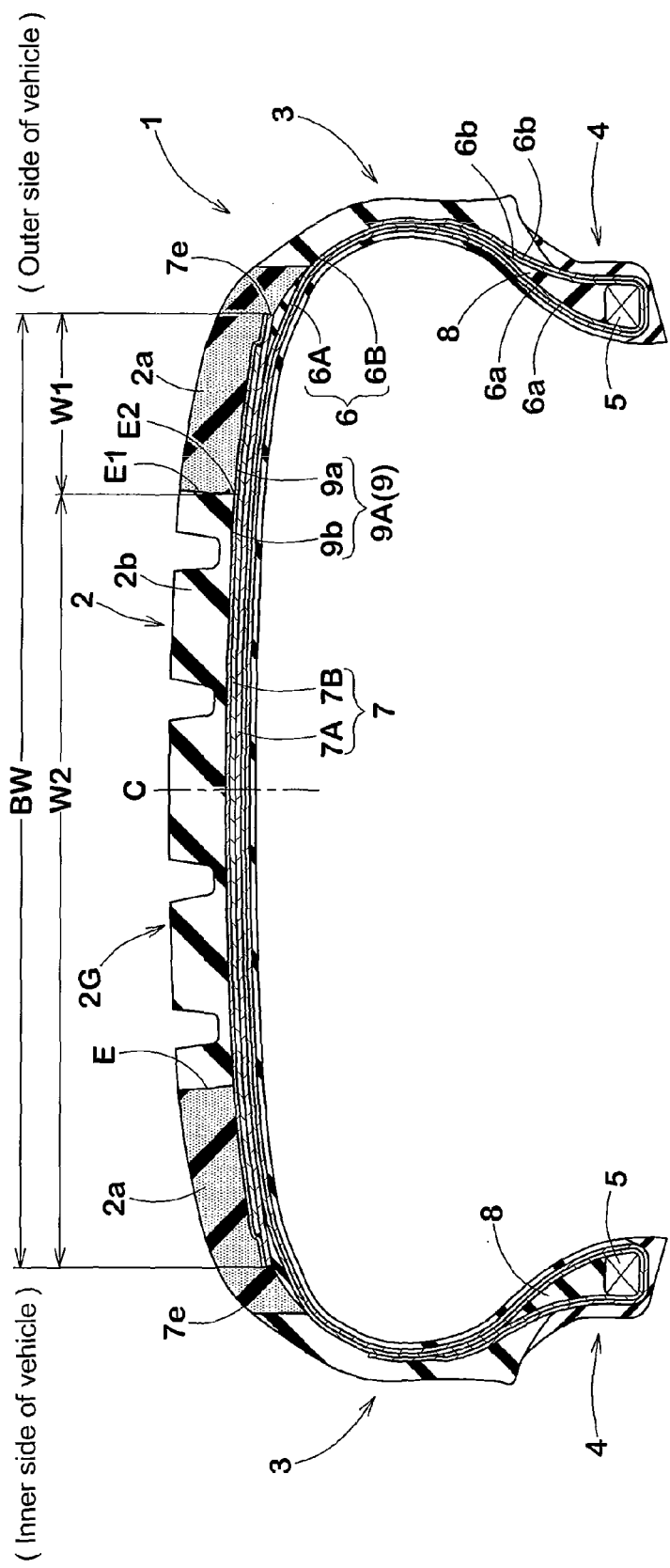
FIG. 6 is a cross sectional view of the pneumatic tire showing yet another embodiment of the present invention.

FIG. 6 shows another embodiment of the present invention. In this embodiment, the tread rubber 2G comprises a pair of the first rubber portions 2a made of the hard rubber and disposed in the both end portions thereof, and the above-mentioned second rubber portion 2b made of the soft rubber and disposed between these first rubbers 2a, 2a. The first rubber portion 2a is arranged substantially symmetrically with respect to the tire equator C. In such an embodiment, the rigidity of the tread portion 2 in an inner side of the vehicle can improve more than in the embodiment shown in FIG. 1; therefore, the steering stability can increasingly improve.

Figure 7:
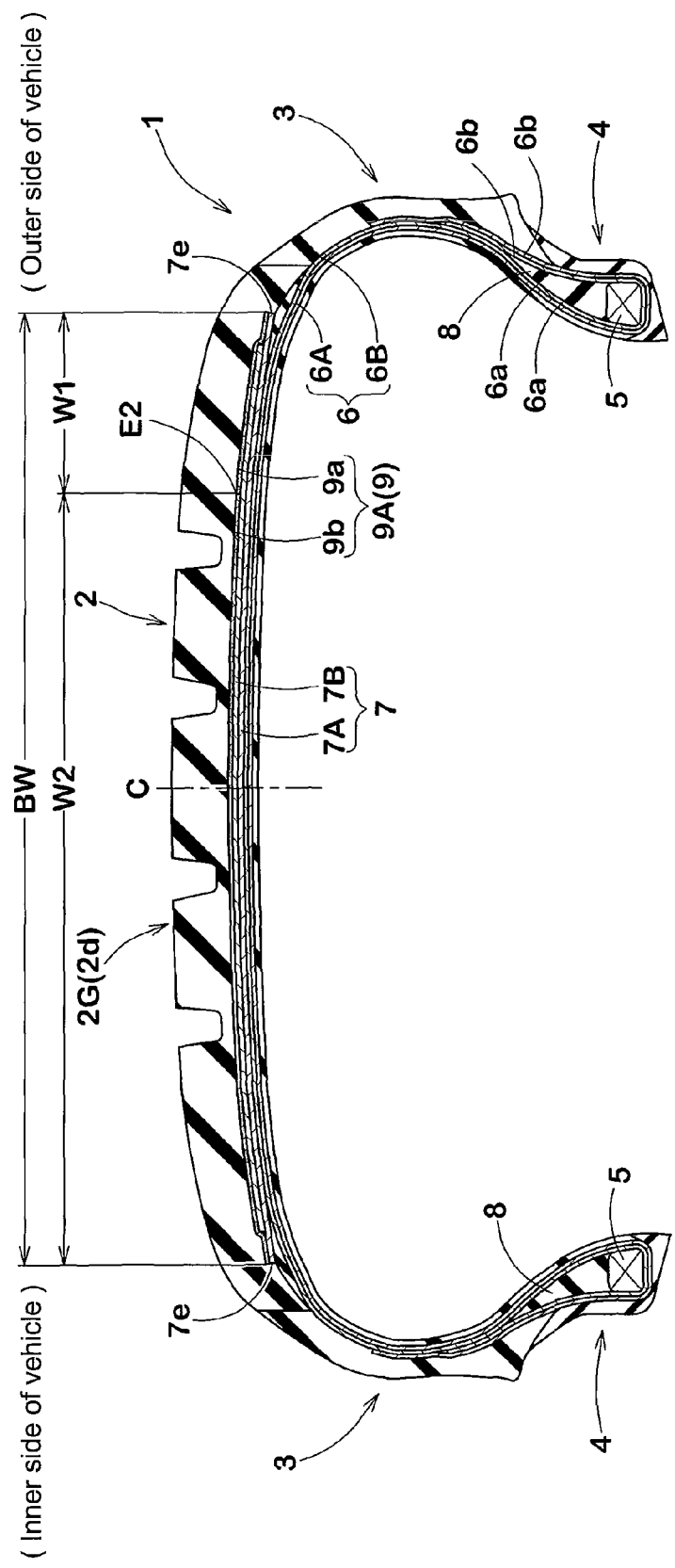
FIG. 7 is a cross sectional view of the pneumatic tire showing yet another embodiment of the present invention.

And, in the pneumatic tire 1 explained in each of the above-mentioned embodiments, the tread rubber 2G comprises the first rubber portion 2a and the second rubber portion 2b, which differ in hardness. However, as shown in FIG. 7, it will be obvious that the tread rubber 2G can be formed of a kind of forth rubber portion 2d having the same hardness, for example. In this case, a hardness of the forth rubber portion 2d is preferably not less than 60 deg., more preferably not less than 62 deg.; and the upper limit thereof is preferably not more than 80 deg., more preferably not more than 75 deg.

Figure 8:
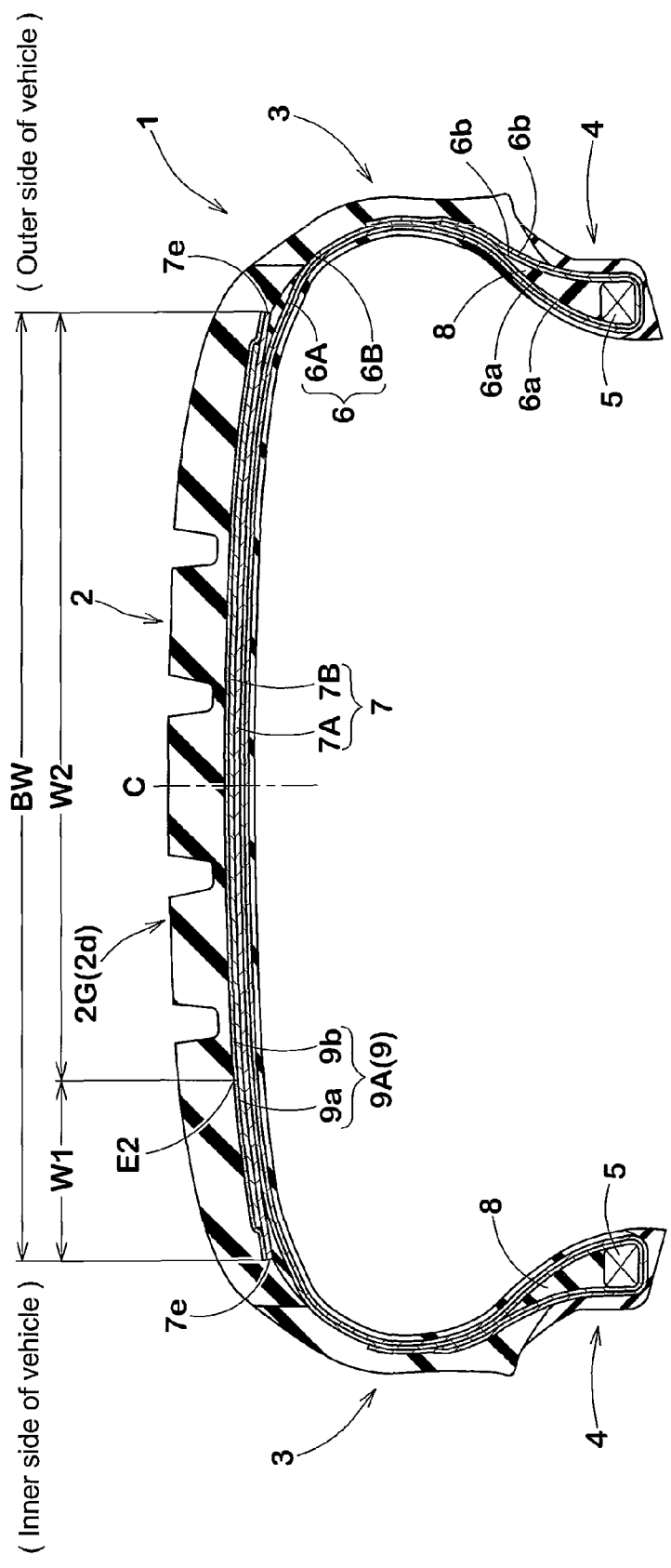
FIG. 8 is a cross sectional view of the pneumatic tire showing yet another embodiment of the present invention.

Meanwhile, in the pneumatic tire 1 of the present embodiment, an arrangement direction to a vehicle can be designated so that the first ply piece 9a comprising the high modulus band cords 9Y1 is disposed on an inner side of the vehicle as shown in FIG. 8. Such an embodiment can also exert the load noise reduction effect.

The embodiments of the present invention have been described in detail, but the invention is not limited to the above-mentioned concrete embodiment. It will be obvious that various changes of aspects can be made.

Embodiments

To ascertain the efficacy of the present invention, a summer tire for passenger car was made by way of test, having a tire size of 225/50R17 on the basis of the specification shown in Table 1. And the tire was tested for steering stability, ride comfort, and road noise performance. A belt layer was comprised of a single band ply having the same width as that of the belt layer, and a ratio W1:W2 between a width W1 of a first ply piece and a width W2 of a second ply piece was as set 1:5. In an embodiment that a tread rubber comprised a first rubber portion and a second rubber portion, a junction thereof was set to be arranged at substantially the same portion of a junction of a band ply piece.

And, each of the band cords shown in Table 1 was two fold yarn cords made of twisted two strands. Specifications of each material are as follows:

<Nylon>
  Material: nylon66
  Thickness: 3300 (dtex)
  Twist number: 38 (turns /10 cm)
  Modulus: 17 (cN/dtex)

<PEN-1>
  Material: polyethylene-2,6-naphthalate
  Thickness: 2100 (dtex)
  Twist number: 15 (turns /10 cm)
  Modulus: 42 (cN/dtex)

<PEN-2>
  Material: polyethylene-2,6-naphthalate
  Thickness: 3300 (dtex)
  Twist number: 35 (turns /10 cm)
  Modulus: 49 (cN/dtex)

<Aramid>
  Material: aromatic polyamide
  Thickness: 3300 (dtex)
  Twist number: 43 (turns /10 cm)
  Modulus: 77 (cN/dtex)

Moreover, the tread rubber was consist primarily of SBR (styrene-butadiene rubber) and was adjusted in hardness by adjusting mainly quantities of carbon and oil.

The test method is as follows.

<Steering Stability and Ride Comfort>

As to steering stability, under the undermentioned condition, the car was made to run on dry asphalt roads in a tire test course to evaluate characteristics such as handling responsibility, rigid impression, sense of grip, steering stability while high speed running, and the like based on senses of a driver. With respect to ride comfort, using the test car of the same sort, the test driver evaluated riding comfort based on harshness, thrust up, and damping on dry asphalt road surfaces such as bumpy roads, Belgian roads (stone-paved roads) or Bitsman roads (graveled road surface) based on senses of the driver. The results are indicated into ten ranks with using Reference Example 1 being six points as a benchmark, respectively. The larger the value, the better the ride comfort.

Rim: 17×7.5-J
Internal pressure: 230 kPa
Test car: 3500 cc domestically produced passenger FR car
  (the test tires were mounted on all the wheels).

<Road Noise Performance>

While running the above-mentioned test car on bumpy asphalt roads for noise measurement at a speed of 50 km/h, the over all noise level in dB(A) was measured near the driver's right ear position. The results are indicated by increased and decreased values with using Reference Example 1 as a benchmark. The negative index is better.

Test result is shown in Table 1.

TABLE 1

|  | Ref. Ex. 1 | Ref. Ex. 2 | Ref. Ex. 3 | Ref. Ex. 4 | Ex. 1 | Ex. 2 | Ex. 3 | Ex. 4 |
| --- | --- | --- | --- | --- | --- | --- | --- | --- |
| Structural drawing of tire | — | — | — | — | FIG. 7 | FIG. 7 | FIG. 8 | FIG. 8 |
| Position of a first ply piece with respect to vehicle | — | — | — | — | outer side | outer side | inner side | inner side |
| Band cord material of the first ply piece | nylon | nylon | PEN-1 | PEN-1 | PEN-1 | PEN-1 | PEN-1 | PEN-1 |
| Modulus m1 of band cord of the first ply piece [cN/dtex] | 17 | 17 | 42 | 42 | 42 | 42 | 42 | 42 |
| Hardness h1 of the first rubber portion [deg.] | 67 | 64 | 67 | 64 | 67 | 64 | 67 | 64 |
| Band cord material of a second ply piece | Id. | Id. | Id. | Id. | nylon | nylon | nylon | nylon |
| Modulus m2 of band cord of the second ply piece [cN/dtex] | Id. | Id. | Id. | Id. | 17 | 17 | 17 | 17 |
| Hardness h2 of a second rubber portion [deg.] | Id. | Id. | Id. | Id. | 67 | 64 | 67 | 64 |
| Modulus ratio (m1/m2) | 1.0 | 1.0 | 1.0 | 1.0 | 2.5 | 2.5 | 2.5 | 2.5 |
| Difference in rubber hardness (h1 − h2) [deg.] | 0 | 0 | 0 | 0 | 0 | 0 | 0 | 0 |
| Steering stability | 6 | 5 | 7 | 6 | 7 | 6 | 6.5 | 6 |
| Ride comfort | 6 | 7 | 5 | 5.5 | 6 | 6.5 | 6 | 6 |
| Road noise | ±0 | −0.3 | −1.0 | −1.5 | −0.8 | −1.3 | −0.3 | −0.6 |

TABLE 1-continued

|  | Ex. 5 | Ex. 6 | Ex. 7 | Ex. 8 | Ex. 9 | Ex. 10 |
| --- | --- | --- | --- | --- | --- | --- |
| Structural drawing of tire | FIG. 6 | FIG. 1 | FIG. 1 | FIG. 1 | FIG. 1 | FIG. 1 |
| Position of a first ply piece with respect to vehicle | outer side | outer side | outer side | outer side | outer side | outer side |
| Band cord material of the first ply piece | PEN-1 | PEN-1 | PEN-2 | aramid | aramid | aramid |
| Modulus m1 of band cord of the first ply piece [cN/dtex] | 42 | 42 | 49 | 77 | 77 | 77 |
| Hardness h1 of the first rubber portion [deg.] | 67 | 67 | 67 | 67 | 67 | 67 |
| Band cord material of a second ply piece | nylon | nylon | nylon | nylon | PEN-1 | nylon |
| Modulus m2 of band cord of the second ply piece [cN/dtex] | 17 | 17 | 17 | 17 | 42 | 17 |
| Hardness h2 of a second rubber portion [deg.] | 64 | 64 | 64 | 64 | 64 | 62 |
| Modulus ratio (m1/m2) | 2.5 | 2.5 | 2.9 | 4.5 | 1.8 | 4.5 |
| Difference in rubber hardness (h1 − h2) [deg.] | 3 | 3 | 3 | 3 | 3 | 5 |
| Steering stability | 7 | 7 | 7 | 6.5 | 7 | 7 |
| Ride comfort | 6.5 | 7 | 7 | 6 | 6 | 7 |
| Road noise | −1.0 | −1.5 | −1.8 | −2.0 | −1.8 | −2.2 |

The test results confirmed that the tires according to Examples achieved compatibly on a high level in the steering stability, the ride comfort, and the road noise.

The invention claimed is:

1. A pneumatic tire comprising
a toroidal carcass extending from a tread portion to a bead core in each bead portion through each sidewall portion,
a belt layer made of at least two belt plies arranged in the radially outer side of the carcass and inside the tread portion and having belt cords arranged at an angle of 15 to 40 deg. with respect to the tire equator,
a band layer made of a band ply arranged in the radially outer side of said belt layer and having band cords arranged at an angle of not more than 5 deg. with respect to the circumferential direction of the tire, and
a tread rubber arranged in the radially outer side of said band layer,
characterized in that
(a) said band ply comprises a first ply piece covering only one side of end portions of said belt layer and a second ply piece disposed adjacently to the first ply piece, covering continuously the central portion of said belt layer and another side of the end portions, and having a width larger than that of said first ply piece;
(b) a modulus of the band cords of said first ply piece is larger than that of the band cords of said second ply piece, and
(c) said tread rubber is composed of (i) a first rubber portion arranged on an outer side of said first ply piece in the radial direction of the tire and (ii) a second rubber portion, having a hardness different from that of said first rubber portion, arranged on an outer side of said second ply piece in the radial direct of the tire, wherein said first rubber portion is harder than said second rubber portion.

2. The pneumatic tire as set forth in claim 1, wherein a ratio (m1/m2) between a modulus m1 of the band cords of said first ply piece and a modulus m2 of the band cords of said second ply piece is more than 1.0 and not more than 7.0.

3. The pneumatic tire as set forth in claim 1, wherein a difference (h1−h2) between a hardness h1 of said first rubber portion and a hardness h2 of said second rubber portion is 2 to 10 deg.

4. The pneumatic tire as set forth in claim 1, wherein the value of the difference (h1−h2) between the hardness h1 of said first rubber portion and the hardness h2 of said second rubber portion is larger than the ratio (m1/m2) between the modulus m1 of the band cords of said first ply piece and the modulus m2 of the band cords of said second ply piece.

* * * * *